United States Patent [19]

Curley, Jr.

[11] Patent Number: 4,500,019

[45] Date of Patent: Feb. 19, 1985

[54] CARRIER FOR PORTABLE AUDIO DEVICES

[76] Inventor: John J. Curley, Jr., P.O. Box 206, Pleasant St., Dunstable, Mass. 01827

[21] Appl. No.: 507,284

[22] Filed: Jun. 23, 1983

[51] Int. Cl.³ .......................................... A45C 11/00
[52] U.S. Cl. .................................. 224/222; 224/242; 224/901
[58] Field of Search ............... 224/222, 224, 219, 221, 224/901, 904, 907, 242, 251; 2/DIG. 1, 16, 170, 413, 181.6; 206/315.1, 522; 150/52 R, 52 J; 441/122, 106, 123; 128/89 R, 118, 165, 574

[56] References Cited

U.S. PATENT DOCUMENTS

| | | | |
|---|---|---|---|
| 1,488,049 | 3/1924 | Lawless | 441/122 |
| 2,582,648 | 1/1952 | Mowbray | 128/165 X |
| 2,694,395 | 11/1954 | Brown | 128/118 |
| 2,729,259 | 1/1956 | Abrams | 150/52 R |
| 2,943,859 | 7/1960 | Koski et al. | 128/165 X |
| 3,083,708 | 4/1963 | Gottfried | 128/165 X |
| 3,186,404 | 6/1965 | Gardner | 128/165 X |
| 3,212,690 | 10/1965 | Green | 224/222 X |
| 3,657,741 | 4/1972 | Blanco | 2/DIG. 1 X |
| 3,741,203 | 6/1973 | Liman | 128/165 X |
| 3,761,962 | 10/1973 | Myers | 2/DIG. 1 X |
| 3,811,434 | 5/1974 | Jacobson et al. | 128/89 R |
| 3,883,053 | 5/1975 | Pritchard et al. | 206/522 X |
| 3,987,736 | 10/1976 | Miller | 206/522 X |
| 4,135,653 | 1/1979 | Sieloff | 224/222 |
| 4,142,252 | 3/1979 | Storer | 2/16 X |
| 4,347,956 | 9/1982 | Berger | 150/52 J X |
| 4,384,602 | 5/1983 | Ores | 224/209 |
| 4,432,477 | 2/1984 | Haidt et al. | 224/901 X |

FOREIGN PATENT DOCUMENTS

| | | | |
|---|---|---|---|
| 1103026 | 10/1955 | France | 441/123 |
| 352467 | 4/1961 | Switzerland | 224/219 |
| 2090792 | 7/1982 | United Kingdom | 441/122 |

*Primary Examiner*—Stephen Marcus
*Assistant Examiner*—Robert Petrik
*Attorney, Agent, or Firm*—William E. Noonan

[57] ABSTRACT

A carrier apparatus for portable audio devices including an armband portion longitudinally wrappable about a wearer's upper arm and having an upper section which includes a first inflatable chamber, a lower section which includes a second inflatable chamber and an intermediate section interconnecting the upper and lower sections. The armband further includes one or more ports for introducing a fluid into the chambers to thereby inflate the chambers into a condition wherein the armband is laterally contoured to substantially conform to the muscular contour of the arm and thereby maintain a substantially fixed position along the length of the arm. A receptacle is attached to the armband for holding a portable audio device.

17 Claims, 8 Drawing Figures

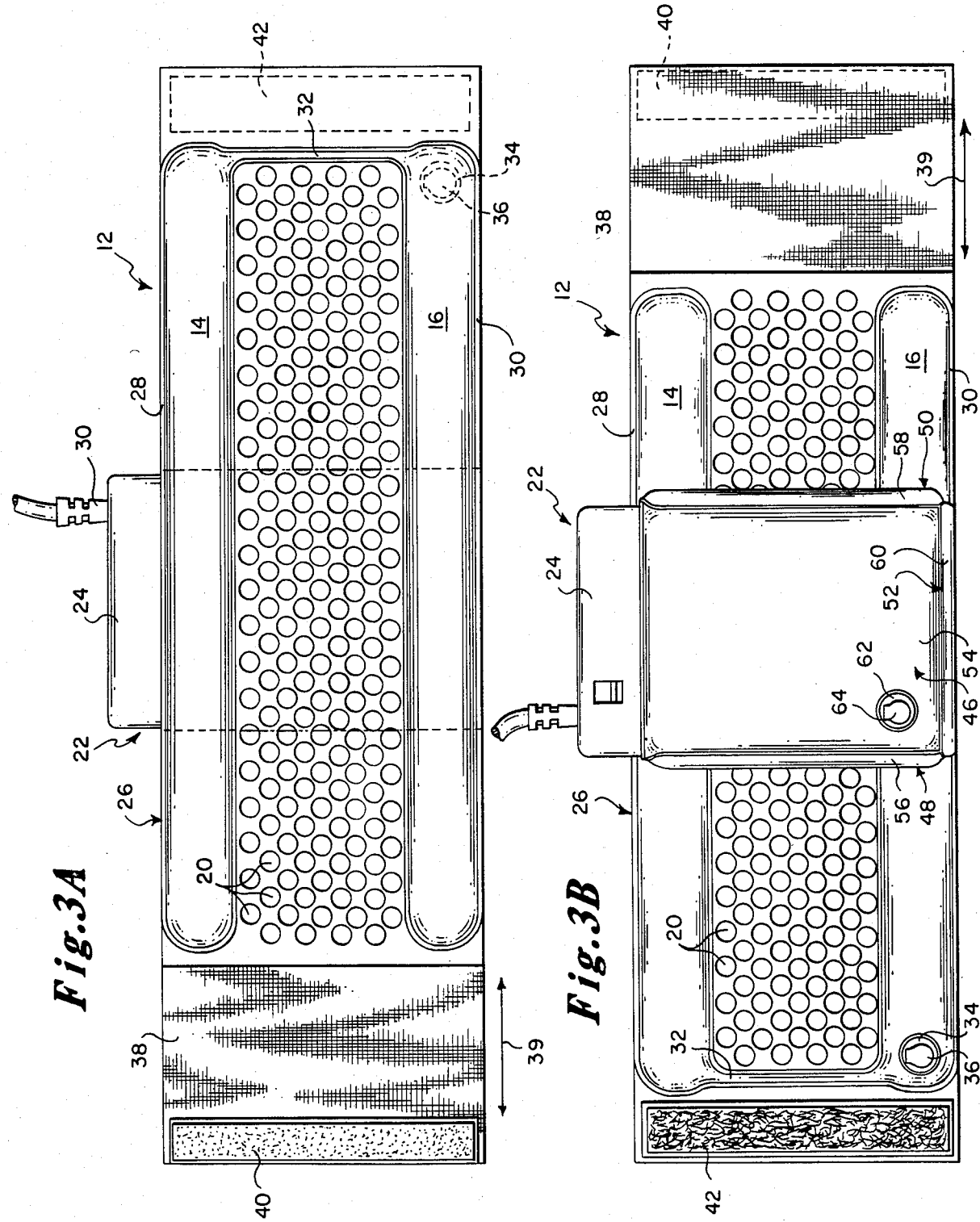

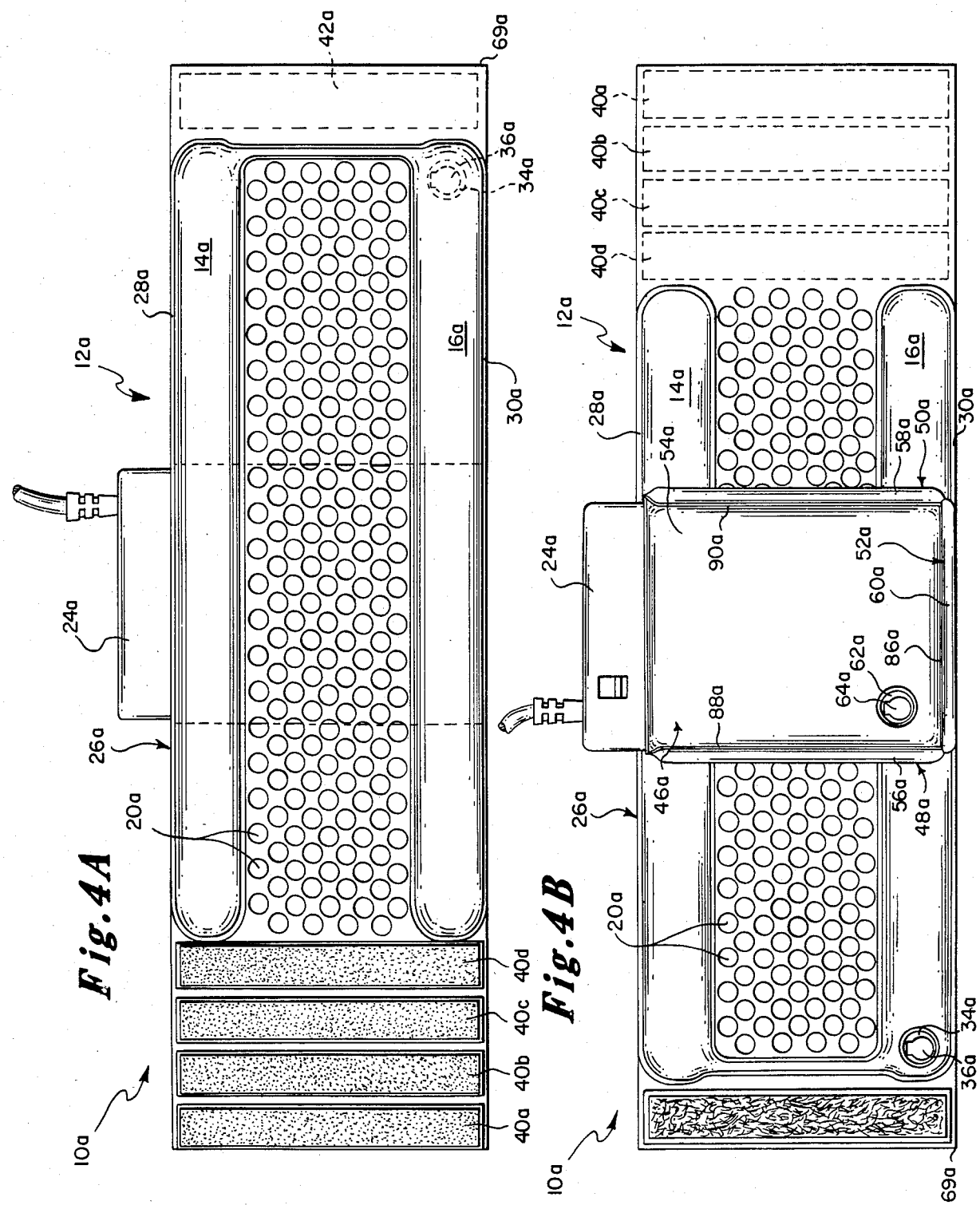

CARRIER FOR PORTABLE AUDIO DEVICES

FIELD OF INVENTION

This invention relates to an improved apparatus for carrying portable audio devices such as radios and tape players and in particular, to such an apparatus which may be securely and comfortably worn during a wide variety of physical activities.

BACKGROUND OF INVENTION

Various appliances are presently employed for carrying portable audio devices such as radios and tape players on an individual's body. Certain carriers include an armband which is strapped to the wearer's upper arm and, a holder for the audio device which is attached to the armband, thereby enabling the radio or tape player to be carried by persons engaged in jogging, bicycle riding, hiking, skiing, and other physical activities.

Carrier applicances of this type typically exhibit one or more disadvantages which hinder their use in strenuous activities. For example, the armband may fit too loosely and thus the device being carried tends to slide up and down along the arm as the wearer moves about. Such an annoyance may significantly interfere with operation of the audio device and/or the physical activity in which the listener is engaged.

To minimize such sliding or bouncing, arm mounted carriers of the prior art often employ stretch bands which are wrapped and secured about the arm. However, in order for such armbands to be fastened securely enough to prevent sliding, turning, or flopping of the applicance and the device it carries, the band must typically be stretched so tightly that it tends to impede the circulation of blood through the arm. This effect is most undesirable when the wearer is engaged in running or other aerobic activities which require optimum blood circulation.

SUMMARY OF INVENTION

It is therefore an object of this invention to provide an improved carrier apparatus for portable audio devices which securely attaches to the wearer's arm so as to minimize sliding and turning thereon while at the same time not interfere with the circulation of blood.

It is a further object of this invention to provide a carrier apparatus for portable audio devices which may be adjusted to comfortably and securely fit most all human upper arms.

It is a further object of this invention to provide a carrier apparatus for portable audio devices which holds a wide variety of portable audio devices securely in place thereby greatly reducing slipping, bouncing, or dropping of the device during strenuous activities by the wearer.

It is a further object of this invention to provide a carrier apparatus for portable audio devices which is lightweight and may be worn without interference during a wide variety of physical activities (e.g., running, bicycle riding, skiing, etc.)

It is a further object of this invention to provide a carrier apparatus for portable audio devices which is collapsible to permit convenient storage and transport during nonuse.

This invention features a carrier apparatus for portable audio devices including an armband portion longitudinally wrappable about a human arm and having a thick upper section, a thick lower section and a thin intermediate section interconnecting the upper and lower sections. The armband is laterally contoured to substantially conform to the muscular contour of the arm and to thereby maintain a substantially fixed position along the length of the arm. There are means attached to the armband portion for holding a portable audio device.

More particularly, the carrier apparatus features an armband portion having an upper section which includes means defining a first inflatable chamber, a lower section which includes means defining a second inflatable chamber and an intermediate section interconnecting the upper and lower sections. The armband portion further includes port means for introducing a fluid into the chambers to thereby inflate the chambers into a condition wherein the armband is laterally contoured to substantially conform to the muscular contour of the arm and thereby maintains a substantially fixed position along the length of the arm. Means are attached to the armband portion for holding a portable audio device.

In a preferred embodiment, the armband includes an elongate flexible strap, composed of lightweight material such as plastic, having complementary means proximate opposite ends thereof for attaching, and preferably releasably attaching the strap to itself. Such means for attaching typically include a first Velcro element mounted proximate one end of the strap and a second complementary Velcro element mounted proximate the opposite end. A first Velcro element may be mounted to and extend laterally across the strap proximate one end thereof while a plurality of complementary elements are mounted to and extend laterally across the strap proximate the opposite end. Alternatively, buttons, snaps, or other attachment means may be employed. Means may also be provided for adjusting the length of the strap prior to attachment of the strap itself. Such means may include a longitudinally elastic portion of the strap to which one of the means for attachment is mounted.

Typically the first and second chambers are disposed respectively along upper and lower edges of the armband portion. Note that although a single chamber along each edge is preferred, multiple and/or relatively short length chambers may be employed. Conduit means communicably interconnecting first and second chambers may be provided for conducting inflating fluid therebetween. The intermediate section preferably includes a plurality of ventilating holes therethrough.

Although a single port and conduit means interconnecting the chambers is preferred alternatively the conduit means may be eliminated and each chamber provided with a port.

The means for holding typically includes a receptacle and means for adjusting the shape and size of the receptacle to snuggly accommodate the portable audio device. The receptacle may have at least one inflatable chamber and port means for introducing fluid into each receptacle chamber to thereby inflate the receptacle into a condition wherein the audio device is snuggly accommodatable therein. For example, the receptacle may include a rear wall portion, attached to the armband portion, a front wall portion opposite and substantially parallel spaced sidewall portions interconnecting the front and rear wall portions and a base portion connected to at least one pair of opposing wall portions at the bottom thereof. Preferably, the front and sidewall portions each includes an inflatable chamber. Conduit means communicably interconnecting receptacle chambers may also be provided for enabling conduction of inflating fluid therebetween. Alternatively, each receptacle chamber may be provided with its own port means.

Other objects, features and advantages of the invention will become apparent from the following detailed description of the preferred embodiments with reference therein to the accompanying drawings in which:

A BRIEF DESCRIPTION OF THE DRAWINGS

Figure 5B:
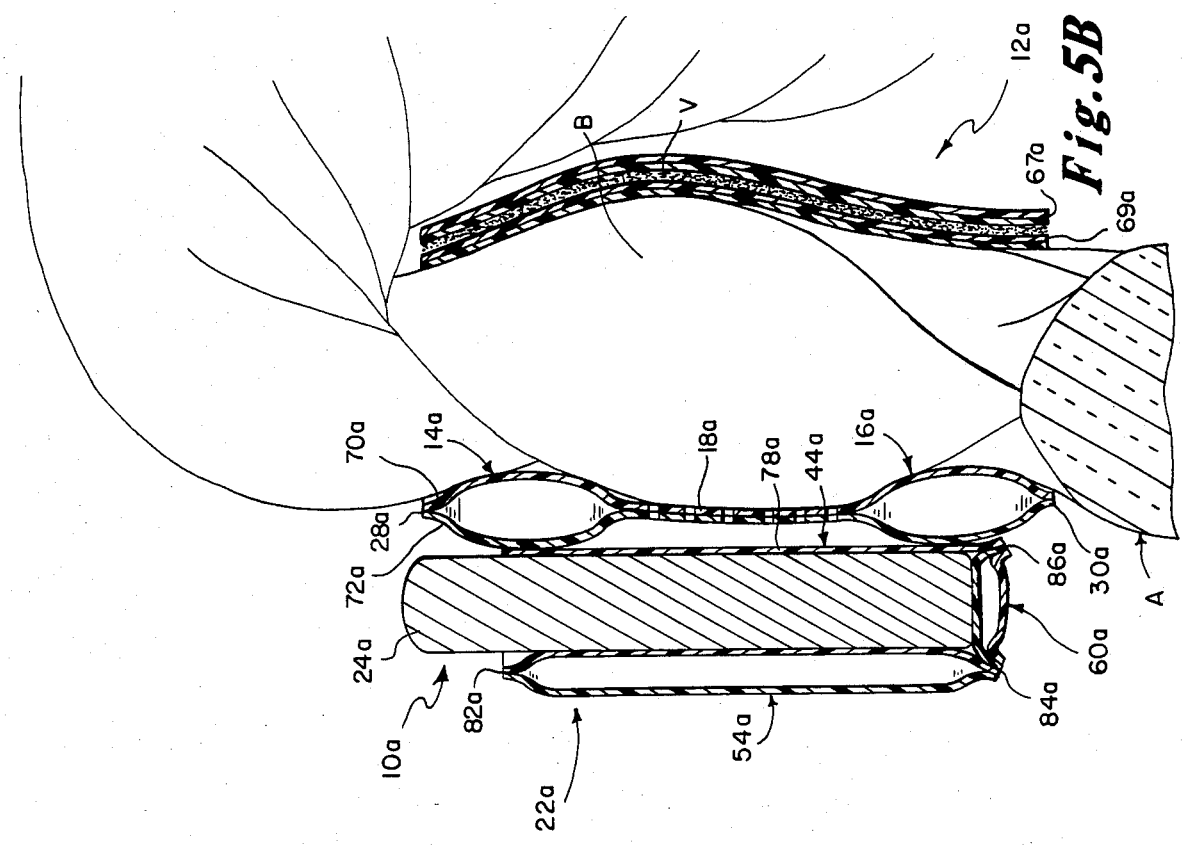
Figure 5A:
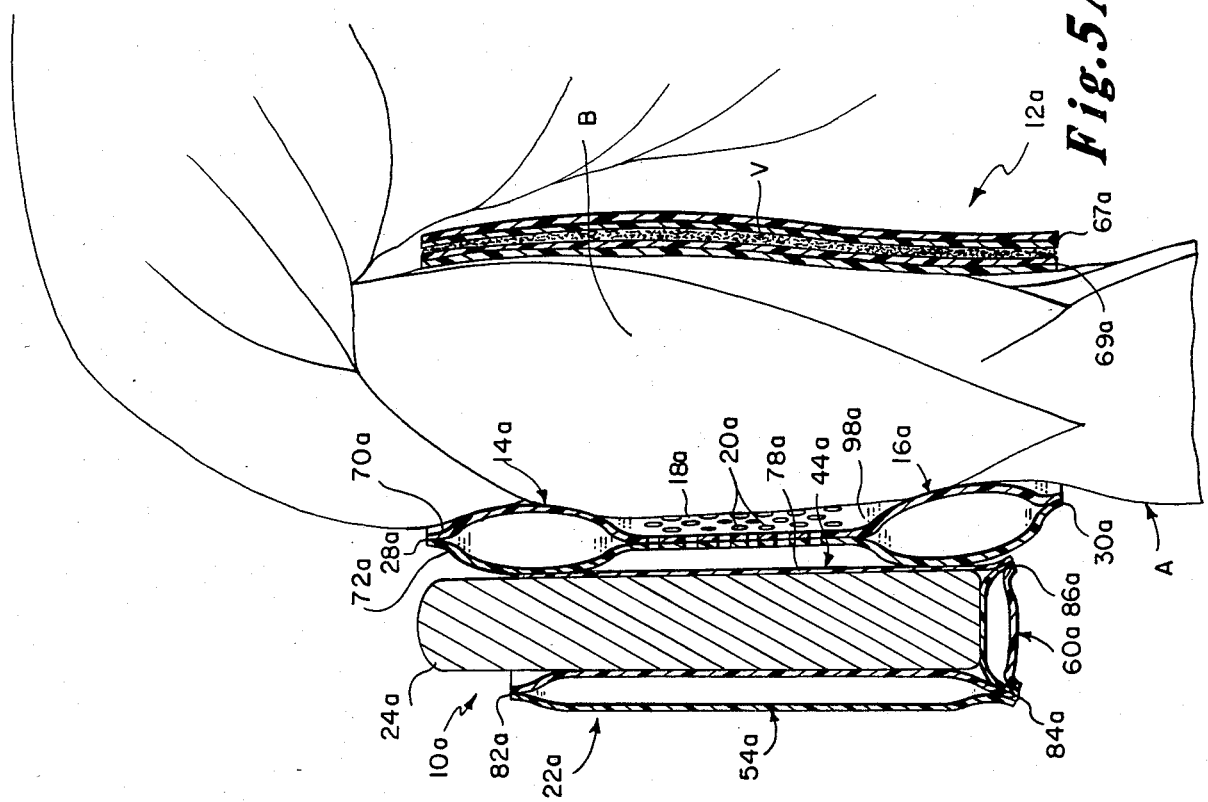

FIG. 3A. & FIG. 3B are inner and outer surface plan views of a preferred embodiment of this invention illustrating the carrier apparatus unattached, stretched out flat and employing an elastic portion proximate one end for enabling length adjustment thereof;

FIG. 4A & FIG. 4B are views similar to FIGS. 3A & 3B of an alternative carrier apparatus which employes a plurality of Velcro strips at one end for enabling the length of the armband to be adjusted prior to fastening the carrier to the wearer's arm; and FIG. 5A & FIG. 5B are cross-sectional views of the carrier apparatus of FIGS. 4A & 4B mounted to a wearer's arm in arm straightened and arm bent positions, respectively.

Figures 1, 2:
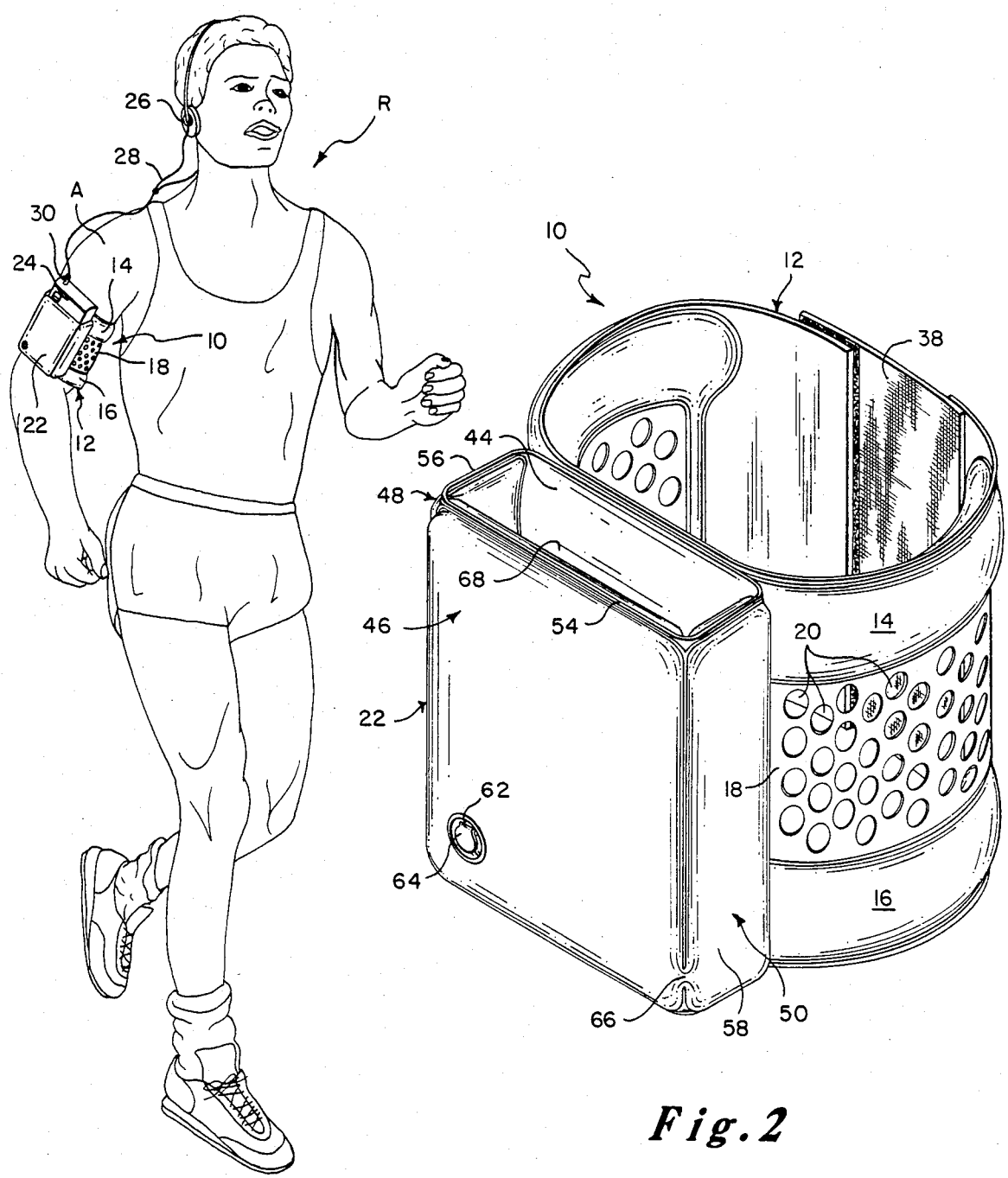
FIG. 1 is an isometric view of the carrier apparatus of this invention being worn by a runner.
FIG. 2 is an isometric view of the carrier apparatus with the armband attached to itself but with the wearer and audio device omitted for clarity.

There is shown in FIG. 1 a carrier apparatus 10, according to this invention, attached to the upper arm A of a runner R. The apparatus alone is illustrated in FIG. 2. An armband portion 12, is wrapped longitudinally about the arm. Armband 12, includes an upper chamber 14, a lower chamber 16 and an intermediate section 18 interconnecting upper and lower chambers 14 and 16. Section 18 includes a plurality of holes 20 which enhance ventilation of the arm during running, thus reducing the perspiration produced between armband 12 and the arm and the discomfort caused thereby.

A receptacle 22 is attached (as described more clearly hereafter) to the outside of armband 12. Receptacle 22 holds a portable radio or tape player 24 securely therein. Earphones 26 are connected via a wire 28 and connector 30 to a jack in device 24 and such earphones may be worn by runner R to enable him to listen to the audio device during running or other physical activity. Carrier 10 is worn comfortably on the arm without impeding blood circulation. At the same time, carrier 10 does not slide up and down arm A and device 24 does not slip or fall out of receptacle 22. A construction which enables such advantages is now described in detail:

Armband portion 12 includes an elongate flexible strap which when removed from the wearer, may be stretched out in a generally flat manner, as illustrated in FIGS. 3A & 3B. The inside of armband 12 (e.g., the surface in contact with the arm) is pictured in FIG. 3A, whereas the outside surface of armband 12, to which receptacle 22 is attached, is shown in FIG. 3B. Section 26 of armband 12 comprises lightweight plastic or similar material.

Inflatable chamber 14 is provided along the top edge 28 of armband section 26 and inflatable chamber 16 is disposed along the bottom edge 30 thereof. A conduit 32 extends laterally across intermediate section 18 to communicably interconnect chambers 14 and 16. Ventilating holes 20 are disposed in section 18 of armband 12 and are arranged within the area defined by the chambers 14, 16 and interconnecting conduit 32.

A port 34 is provided in chamber 16 to enable inflation of the chambers. A cap 36, constructed of material similar to section 26 is hingable and typically permanently attached to section 26. It is lifted or snapped open in a conventional manner to open port 34 and is pressed or snapped down to seal the port. Typically the chambers are manually inflated with air or other fluids. The wearer removes cap 36 from port 34, exhales (blows) in the port until the desired level of inflation is achieved, and then replaces cap 36 to maintain the chambers in an inflated condition. Conduit 32 allows for fluid communication between the chambers and thus enables both chambers 14 and 16 to be inflated through the single port 34. Although manual inflation is preferred, pumps or other unpictured inflation means may be employed. When use of apparatus 10 is completed and storage is desired, the chambers may be deflated and armband section 26 flattened by removing cap 36 and allowing the inflating air to escape.

An elastic section 38 resiliently stretchable in the direction of arrow 39 is permanently attached to one end of section 26. A Velcro strip element 40 is carried at one end of armband 12 and in particular, is attached to the inside elastic surface 38 so as to extend laterally thereacross. A complementary lateral Velcro strip element 42 is carried at the opposite end of armband 12 on the outside, FIG. 3B of section 26 thereof.

Receptacle 22, FIGS. 2, 3A, 3B, is glued, heat sealed or otherwise permanently attached to the outside surface of armband 12. The receptacle is constructed of a flexible lightweight material similar to that of armband section 26. Rearwall portion 44 of receptacle 22 is fastened to the outside of section 26 and in particular to chambers 14 and 16 thereof. The receptacle also includes a front wall portion 46 spaced from and substantially parallel to rearwall 44 and a pair of sidewalls 48 and 50 interconnecting frontwall 46 and rearwall 50. A base 52 is also provided at the bottom of receptacle 22.

Frontwall 46, sidewalls 48, 50 and base 52 each includes a respective inflatable chamber 54, 56, 58, 60. Such chambers in the front wall and base are shown more clearly in the alternative embodiment of FIGS. 5A, 5B. A port 62, FIGS. 2, 3B is provided in the front wall 46 for enabling inflating fluid such as air to be introduced into and removed from the receptacle chambers. A cap 64, shown closed in FIGS. 2, 3B, is provided to seal the inflated receptacle so that it may be employed to carry an audio device 24. Cap 64 is constructed and operated similarly to cap 36 covering port 34.

To inflate receptacle 22, cap 64 is opened and air is blown or otherwise introduced via port 62 into front wall chamber 54. As shown in FIG. 2, a conduit 66 communicably connects chamber 54 with sidewall chamber 58. Similar unpictured conduit means interconnect sidewall chamber 56 and base chamber 60 with chamber 54. Air introduced through port 62 thus fills each of the receptacle chambers. These chambers are filled until the opening 68, FIG. 2, in receptacle 22 is the proper size to snuggly accommodate audio device 24 as shown in FIGS. 1 and 3B.

Following inflation of the armband and receptacle chambers in the aforedescribed manner apparatus 10 may be strapped to the wearer's arm as follows: The inside surface, FIG. 3A, of armband 12 is placed against the wearer's upper arm and wrapped thereabout so that upper chamber 14 sits generally atop the bicep and lower chamber 16 extends about the arm generally below the bicep (For a clearer view, see alternative carrier 10, FIGS. 5A, 5B). Elastic section 38, FIGS. 3A, 3B, is stretched in the direction of arrow 39 until Velcro strip 40 is aligned over complementary Velcro strip 42. The Velcro strips are often then pressed together, as in FIG. 2, and carrier 10 is securely fastened about the arm as in FIG. 1. Because only a small portion 38 of armband 12 is stretched about the arm (rather than the entire armband as in the prior art) the armband is not wrapped overly tight about the arm and blood is allowed to freely circulate therethrough. Audio device 24 may be inserted into receptacle opening 68 either before or after the carrier is donned.

To remove carrier apparatus 10, the Velcro strips 40, 42 are simply separated and the strap is unwrapped from about the arm. Port caps 36 and 64 are opened to deflate the armband and receptacle chambers respectively. The flexible lightweight composition of the apparatus 10 then allows it to be folded and conveniently stored and transported.

An alternative carrier 10a is illustrated in FIGS. 4A, 4B. Armband 12a has no elastic section at one end thereof. Rather, at end 69a, it carries four lateral Velcro strip elements (40a, b, c and d) on the inside surface, FIG. 4A, thereof. At the opposite end 69a of armband 12a, a single complementary lateral Velcro strip 42a is mounted to the outside surface, FIG. 4B. All other elements of this embodiment are identical to the elements exhibited by carrier 10 of FIGS. 3A and 3B: like parts have been given like numbers accompanied by lower case "a" designations.

To utilize carrier 10a, the armband and receptacle chambers are inflated. Armband 12a, which is constructed to be longer than the circumference of the typical upper arm, is wrapped about the arm, as shown in FIGS. 5A and 5B, (and analogously to the embodiment of FIG. 1). Velcro strip 42a is thus aligned beneath one of the complementary strips 40a-d. Just which of the strips 40a-d is used depends upon the size (circumference) of the wearer's upper arm. A large arm may dictate that strip 40d be aligned with strip 42a whereas a small arm may require that strips 40a and 42a be matched. Strip 42a and the aligned strip 40a-d are then pressed together and armband 12a is fastened in a manner similar to armband 12. Note that if Velcro strip 42a is attached to strips 40a-c one or more excess strips are left dangling at the end of the armband. These strip may be cut from armband 12a with scissors or other means. Alternatively, they may be left on armband 12a to permit future adjustment (e.g. to allow for fastening to larger upper arms).

The construction and operation of the carrier 10a of this invention is illustrated in greater detail in FIGS. 5A, 5B. Armband 12a comprises an inner sheet 70a of plastic or other lightweight material and an outer sheet 72a of similar material. Sheets 70a and 72a are pressed together and heat sealed or otherwise permanently attached such as along intermediate section 18a along top and bottom edges 28a, 30a, and at ends 67a, 69a. Where the sheets are not sealed together chambers 14a and 16a (and also the ommitted conduit therebetween) are formed. The interlocking complementary Velcro elements, indicated generally by V secure the carrier apparatus 10a to the arm A.

Receptacle 22a includes inflatable lightweight sheets 78a, 80a which are sealed along the edges thereof, such as along edges 82a, 84a, 86a, FIGS. 5A, 5B and edges 86a, 88a and 90a, FIG. 4B. Where sheets 78, 80a are not sealed inflatable front wall and base chambers 54a, 60a are formed. The sidewalls, omitted in FIGS. 5A, 5B are constructed in a like manner. Note that the edges are also left unsealed at certain points to provide receptacle conduits such as 66, FIG. 2. The rear wall 44a includes no chamber and thus includes only a single sheet 78a attached to armband 12a. Note alternatively that discrete sets of inner and outer sheets may be provided for each of the front and sidewalls and the base. Each such pair of sheets are peripherally heat sealed together and then sealed to adjoining walls of the receptacle 22a.

Audio device 24a snuggly fits within receptacle 22a. If the device 24a becomes loose the fit is adjusted simply by adding more air to the receptacle chambers, e.g. 54a, 60a, thereby decreasing the room within receptacle 22a and providing a tighter fit for audio device 24a.

As shown in FIGS. 5A, B carrier 10 adjusts to the muscular contour of arm A so that it may be worn comfortably thereon during strenuous exercise. When arm A straightens, FIG. 5A; bicep B flattens. Chambers 14a, 16a sit atop and below bicep B and the attached ends respectly 67a, 69a of armband 12a conform to the inside of the arm. A small gap 98a exists between bicep B and intermediate section 18a. (Note ventilation holes 20a therein). When arm A is bent, as in FIG. 5B, chambers 14a, 16a maintain their positions above and below bicep B. While the muscle bulges to fill in the gap formed by intermediate section 18a thereby enabling section 18a to conform to the bicep. At the same time attached inner ends 67a, 69a, of armband 12a, flex to maintain conformity with the inside of bulding bicep B.

Carrier 10a may be removed, deflated and stored in a manner similar to that shown for carrier 10.

It is evident those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. A carrier apparatus for portable audio devices comprising:
    an armband portion longitudinally wrappable about a human upper arm and having an upper section which includes means defining a first inflatable chamber, a lower section which includes means defining a second inflatable chamber and an intermediate section which interconnects said upper and lower sections and is thin relative to said upper and lower chambers when said chambers are inflated, said armband portion further including port means for introducing a fluid into said chambers to thereby inflate said chambers into a condition wherein said armband is laterally contoured to substantially conform to the muscular contour of said upper arm and thereby maintains a substantially fixed position along the length of said arm; and
    means attached to said armband portion of holding a portable audio device.

2. The apparatus in accordance with claim 1 wherein said armband portion includes an elongate flexible strap having complementary means proximate opposite ends thereof for attaching the strap to itself.

3. The apparatus in accordance with claim 2 wherein said means for attaching include a first Velcro element mounted proximate one end of said strap and a second complementary Velcro element mounted proximate the opposite end.

4. The apparatus in accordance with claim 2 wherein said means for attaching include a Velcro strip mounted to and extending laterally across said strap proximate one end thereof and a plurality of complementary Velcro strips mounted to and extending laterally across said strap proximate the opposite end thereof.

5. The apparatus in accordance with claim 2 wherein said means for attaching include means for releasably attaching said strap to itself.

6. The apparatus in accordance with claim 1 in which said first and second chambers are disposed respectively along longitudinal upper and lower edges of said armband portion.

7. The apparatus in accordance with claim 1 in which said armband portion further includes conduit means communicably interconnecting said first and second chambers for conducting inflating fluid therebetween.

8. The apparatus in accordance with claim 1 in which said intermediate section includes a plurality of holes therethrough.

9. The apparatus in accordance with claim 1 in which said means for holding an audio device includes a receptacle and means for adjusting the shape and size of said receptacle to snuggly accommodate said portable audio device.

10. The apparatus in accordance with claim 1 wherein said means for holding an audio device includes a receptacle having at least one inflatable chamber and port means for introducing fluid into each receptacle chamber to thereby inflate said receptacle into a condition wherein said audio device is snuggly accommodatable therein.

11. The apparatus an accordance with claim 10 wherein said receptacle includes a rear wall portion attached to said armband portion, a front wall portion opposite and substantially parallel to said rear wall portion, a pair of substantially parallel spaced sidewall portions interconnecting said front and rear wall portions and a base portion connected to at least one pair of opposing wall portions at the bottom thereof.

12. The apparatus in accordance with claim 11 wherein said front and sidewall portions and said base each includes an inflatable chamber.

13. The apparatus in accordance with claim 11 further including conduit means communicably interconnecting said receptacle chambers for enabling conduction of inflating fluid therebetween.

14. The apparatus in accordance with claim 1 wherein said means for holding an audio device includes a receptacle having inflatable chambers, port means for a plurality of introducing fluid into said chambers to thereby inflate said receptacle into a condition wherein said audio device is snuggly accomodatable therein and conduit means interconnecting said chambers for enabling conduction of inflating fluid therebetween.

15. The apparatus in accordance with claim 2 further including means for adjusting the length of said strap prior to attachment of said strap to itself.

16. The apparatus in accordance with claim 15 wherein said means for adjusting includes a longitudinally elastic portion of said strap to which one of said means for attachment is mounted.

17. A carrier apparatus for portable audio devices comprising:

an armband portion longitudinally wrappable about a human upper arm and having an upper section which includes means defining a first inflatable chamber, a lower section which includes means defining a second inflatable chamber and an intermediate section interconnecting said upper and lower sections, said armband portion further including port means for introducing a fluid into said chambers to thereby inflate said chambers into a condition wherein said armband is laterally contoured to substantially conform to the muscular contour of said arm and thereby maintains a substantially fixed position along the length of said arm; and a receptacle attached to said armband portion and including a rear wall portion attached to said armband portion, a front wall portion opposite and substantially parallel to said rear wall portion, a pair of substantially parallel spaced sidewall portions interconnecting said front and rear wall portions and a base portion connected to at least one pair of opposing wall portions at the bottom thereof, said receptacle further including at least one inflatable chamber and port means for introducing fluid into each receptacle chamber to thereby inflate said receptacle into a condition wherein said audio device is snugly accommodatable therein.

* * * * *